United States Patent
Park

(10) Patent No.: US 7,516,338 B2
(45) Date of Patent: Apr. 7, 2009

(54) METHOD AND APPARATUS FOR TEMPORARILY DECREASING AN EQUIVALENT SERIES RESISTANCE TO DECREASE NOISE DURING A VOLTAGE CHANGE

(75) Inventor: Jeong-Gyu Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 314 days.

(21) Appl. No.: 11/253,611

(22) Filed: Oct. 20, 2005

(65) Prior Publication Data

US 2006/0101295 A1   May 11, 2006

(30) Foreign Application Priority Data

Nov. 8, 2004   (KR) ............... 10-2004-0090230

(51) Int. Cl.
   *G06F 1/00* (2006.01)
(52) U.S. Cl. ............... 713/300; 713/320; 323/364; 327/384; 327/398
(58) Field of Classification Search ........... 713/300, 713/320; 323/364; 327/384, 398
   See application file for complete search history.

(56) References Cited

U.S. PATENT DOCUMENTS

| | | | | |
|---|---|---|---|---|
| 6,242,941 B1 * | 6/2001 | Vest et al. | ............ | 326/26 |
| 6,252,384 B1 * | 6/2001 | Arai et al. | ............ | 323/282 |
| 6,429,632 B1 * | 8/2002 | Forbes et al. | ............ | 323/282 |
| 6,462,607 B1 * | 10/2002 | Nakagawa | ............ | 327/519 |
| 6,661,281 B2 * | 12/2003 | Nakagawa et al. | ............ | 327/554 |
| 6,906,567 B2 * | 6/2005 | Culler | ............ | 327/170 |
| 6,949,967 B2 * | 9/2005 | Wang et al. | ............ | 327/337 |
| 7,103,786 B2 * | 9/2006 | Chen et al. | ............ | 713/320 |
| 7,162,655 B2 * | 1/2007 | McDonald et al. | ............ | 713/320 |
| 7,260,731 B1 * | 8/2007 | Read et al. | ............ | 713/320 |
| 2003/0009702 A1 * | 1/2003 | Park | ............ | 713/300 |
| 2003/0030476 A1 * | 2/2003 | Cowles et al. | ............ | 327/318 |
| 2004/0019815 A1 * | 1/2004 | Vyssotski et al. | ............ | 713/322 |

(Continued)

FOREIGN PATENT DOCUMENTS

JP   62-269240   11/1987

(Continued)

OTHER PUBLICATIONS http://en.wikipedia.org/wiki/DC$_{13}$to—DC_converter.*

(Continued)

*Primary Examiner*—Thomas Lee
(74) *Attorney, Agent, or Firm*—Staas & Halsey LLP

(57) ABSTRACT

A computer having a CPU which operates with at least two operation modes, comprising: a mode signal output unit outputting an operation mode signal corresponding to the operation mode of the CPU; a CPU power supply supplying power having a voltage level corresponding to the operation mode signal outputted from the mode signal output unit to the CPU; and a control unit controlling the CPU power supply to decrease an equivalent series resistance value to power outputted from the CPU power supply for a predetermined period of time for delay from when switching the operation mode of the CPU has been sensed, based on the operation mode signal outputted from the mode signal output unit.

11 Claims, 7 Drawing Sheets

U.S. PATENT DOCUMENTS

| | | | |
|---|---|---|---|
| 2004/0239391 A1* | 12/2004 | Culler | 327/170 |
| 2004/0264223 A1* | 12/2004 | Pihlstrom et al. | 363/89 |
| 2005/0015631 A1* | 1/2005 | McDonald et al. | 713/300 |
| 2005/0040800 A1* | 2/2005 | Sutardja | 323/283 |
| 2005/0062523 A1* | 3/2005 | Wang et al. | 327/554 |
| 2006/0047986 A1* | 3/2006 | Kurts et al. | 713/320 |
| 2006/0075270 A1* | 4/2006 | Seo | 713/320 |
| 2006/0132109 A1* | 6/2006 | Rodriguez et al. | 323/282 |

FOREIGN PATENT DOCUMENTS

| | | |
|---|---|---|
| JP | 9-83247 | 3/1997 |
| JP | 2001-14258 | 1/2001 |
| KR | 1998-015399 | 5/1998 |
| KR | 10-0351844 | 8/2002 |
| KR | 2003-0002163 | 1/2003 |

OTHER PUBLICATIONS

Korean Office Action issued Jan. 27, 2006 in the Korean Patent Application No. 10-2004-0090230.

* cited by examiner

METHOD AND APPARATUS FOR TEMPORARILY DECREASING AN EQUIVALENT SERIES RESISTANCE TO DECREASE NOISE DURING A VOLTAGE CHANGE

CROSS-REFERENCE TO RELATED APPLICATIONS

This application claims the benefit of Korean Patent Application No. 2004-0090230, filed on Nov. 8, 2004, in the Korean Intellectual Property Office, the disclosure of which is incorporated herein by reference.

BACKGROUND OF THE INVENTION

1. Field of the Invention

The present invention relates to a computer for decreasing noise and a control method and medium for decreasing the noise thereof, and more particularly, to a computer capable of decreasing noise generated when an operation mode of a central processing unit (CPU) is switched, and to a control method and medium thereof.

2. Description of the Related Art

Advanced Configuration and Power Interface (ACPI) is an open industry specification applicable to computer hardware, operating systems, software and peripheral interfaces. This specification was co-developed by Intel®, Microsoft®, Toshiba®, etc., supporting mutual communication associated with use of power for operating system, hardware and peripherals.

A conventional power management system of a computer is based on Basic Input/Output System (BIOS). Thus, power supplied to devices could be stopped after a predetermined period of time for inactivating devices has elapsed. However, since the ACPI enables an operating system supporting Operating System Directed Power Management (OSPM) to manage all the activities associated with power supply, power can be supplied to devices only when necessary.

The ACPI published in 1996 defines operation modes associated with power states of the CPU as C0, C1, C2 and C3. C0 is defined as a normal state, C1 as a halt state, C2 as a stop-grant state and C3 as a stop clock state.

Under C2, the CPU performs activities consuming a low amount of power, such as a snooping operation so as to maintain a cache coherence. Under C3 defined as a deep sleep mode, an external clock is not provided to the CPU, and thus, all the activities of the processor, except for a function to maintain data stored in a cache memory within the CPU, are stopped. Accordingly, power consumption under the deep sleep mode C3 is much lower than under C2.

Intel®Corporation has developed Intel® Mobile Voltage Positioning II (IMVP II), an advanced technique for regulating voltages, in which C4 defined as a deeper sleep mode is added as a new power state of the CPU. Under C4, the voltage level of the power supplied to the CPU is considerably lower than when the CPU is not in operation, thereby minimizing power consumption.

FIG. 1 is a diagram illustrating a conventional power supply system of a CPU in a computer.

Referring to FIG. 1, a CPU power supply 130 converts power supplied from an adaptor or a battery into a driving power required for driving the CPU 110, e.g., a core voltage (Vcore), and the CPU power supply 130 supplies driving power to the CPU 110.

The CPU power supply 130 supplies the CPU with a core voltage of the level corresponding to an operation mode signal relative to an operation mode of the CPU 110 supplied from a chipset such as an input/output control hub, namely a mode signal output unit 120. For example, where an operation mode signal corresponding to a deeper sleep mode C4 is received, the CPU power supply 130 supplies the CPU with a core voltage of the level lower (e.g., 0.85V) than the core voltage level (e.g., 1.05V to 1.15V) at the normal state.

Generally, the CPU power supply 130 is constructed with a plurality of electric devices. By way of example, an output side of the CPU power supply 130 comprises a resonant circuit unit formed with multiple capacitors and inductors, and a ceramic condenser.

However, as in the conventional computer, when power management is done according to an operation mode of the CPU, a change in voltage level of the driving power outputted from the CPU power supply due to a switching of the operation mode of the CPU has caused a fluctuation in the output current. This fluctuation in the output current has caused resonant noise from the resonant circuit unit and oscillation noise from the ceramic condenser to be generated.

SUMMARY OF THE INVENTION

Additional aspects, features, and/or advantages of the invention will be set forth in part in the description which follows and, in part, will be apparent from the description, or may be learned by practice of the invention An aspect of the present invention provides a computer capable of decreasing noise generated when an operation mode of a central processing unit (CPU) is switched and a control method and medium for decreasing the noise thereof.

Another aspect of the present invention is to provide a computer capable of reducing power consumption when an operation mode of the CPU is switched and a control method thereof.

The foregoing and/or other aspects of the present invention may also be achieved by providing a computer having a CPU which operates with at least two operation modes, comprising: a mode signal output unit outputting an operation mode signal corresponding to the operation mode of the CPU; a CPU power supply supplying power having a voltage level corresponding to the operation mode signal outputted from the mode signal output unit to the CPU; and a control unit controlling the CPU power supply to decrease an equivalent series resistance value to power outputted from the CPU power supply for a predetermined period of time for delay from when switching the operation mode of the CPU has been sensed, based on the operation mode signal outputted from the mode signal output unit.

According to an exemplary embodiment of the present invention, the operation mode of the CPU includes a deep sleep mode and a deeper sleep mode according to a standard the Advanced Configuration and Power Interface (ACPI).

According to an exemplary embodiment of the present invention, the mode signal output unit changes a logical value of the operation mode signal when the CPU is switched between the deep sleep mode and the deeper sleep mode.

According to an exemplary embodiment of the present invention, the control unit comprises: a switching unit turned on or off to allow the equivalent series resistance value to vary; and a switching control unit turning on or off the switching unit based on the operation mode signal.

According to an exemplary embodiment of the present invention, the switching control unit comprises: a differential circuit unit receiving the operation mode signal to generate a predetermined pulse signal; and a delay circuit unit maintaining an off state of the switching unit for the predetermined period of time for delay from when the pulse signal is outputted, based on the pulse signal outputted from the differential circuit unit.

According to an exemplary embodiment of the present invention, the CPU power supply comprises: a power output unit converting a predetermined input power to a square wave power; a resonant circuit unit converting the square wave power outputted from the power output unit to a sine curve power and supplying the sine curve power to the CPU; and a power control unit controlling a switching operation of the power output unit to be supplied the power of a voltage level corresponding to the operation mode signal from the mode signal output unit to the CPU.

According to an exemplary embodiment of the present invention, the resonant circuit unit comprises: at least one first capacitor; an inductor connected between an output terminal of the square wave power of the power output unit and an input terminal of the first capacitor; and at least one second capacitor connected in parallel to the first capacitor when the switching unit is turned on and disconnected from the first capacitor when the switching unit is turned off.

The foregoing and/or other aspects of the present invention may also be achieved by providing a method of controlling power supply to a computer having a CPU operating with at least two operation modes, comprising: sensing the operation mode of the CPU and outputting an operation mode signal corresponding to a result from the sensing; supplying power having a voltage level corresponding to the operation mode signal to the CPU; and decreasing an equivalent series resistance value to power supplied to the CPU for a predetermined period of time for delay from when switching the operation mode of the CPU has been sensed, based on the operation mode signal.

According to an exemplary embodiment of the present invention, decreasing the equivalent series resistance value comprises: generating a predetermined pulse signal when the operation mode of the CPU is switched, based on the operation mode signal; and decreasing the equivalent series resistance value for the predetermined period of time for delay when the pulse signal is outputted, based on the pulse signal.

The foregoing and/or other aspects of the present invention may also be achieved by providing at least one computer readable medium storing instructions that control at least one processor to perform a method comprising sensing a current operation mode of the CPU and outputting an operation mode signal corresponding to a result from the sensing; supplying power having a voltage level corresponding to the operation mode signal to the CPU; and decreasing an equivalent series resistance value to power supplied to the CPU for a predetermined period of time from when switching the current operation mode of the CPU has been sensed, based on the operation mode signal.

BRIEF DESCRIPTION OF THE DRAWINGS

These and/or other aspects, features, and advantages of the present invention will become apparent and more readily appreciated from the following description of the exemplary embodiments, taken in conjunction with the accompanying drawings of which.

DETAILED DESCRIPTION OF THE PREFERRED EMBODIMENTS

Figure 1:
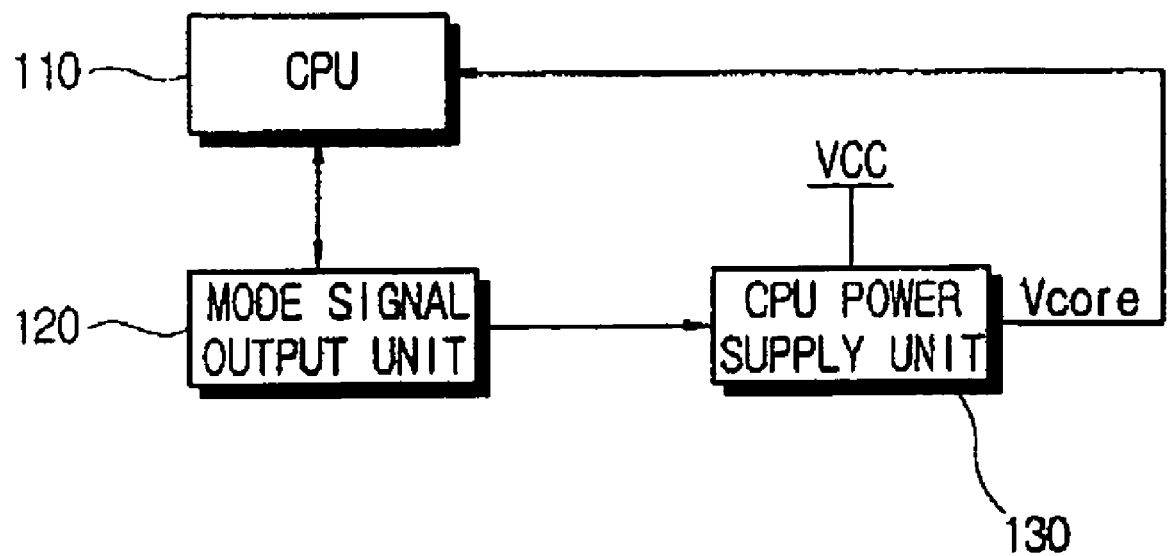
FIG. 1 is a block diagram illustrating a control by a conventional computer.

Reference will now be made in detail to exemplary embodiments of the present invention, examples of which are illustrated in the accompanying drawings, wherein like reference numerals refer to like elements throughout. Exemplary embodiments are described below in order to explain the present invention by referring to the figures.

Figure 2:
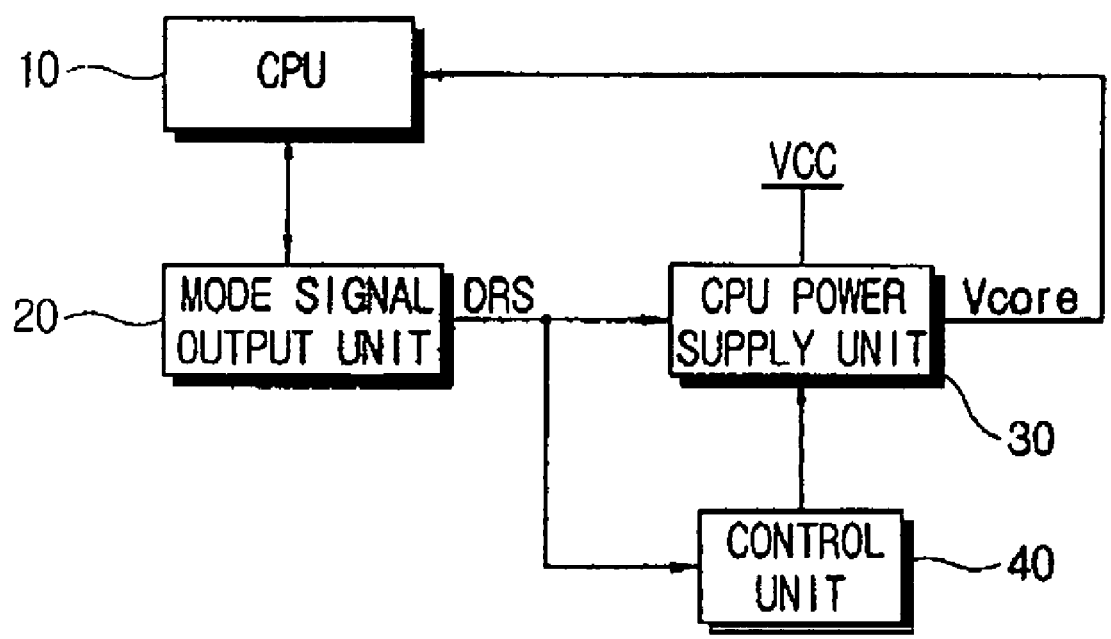
FIG. 2 is a block diagram illustrating a control by a computer according to an exemplary embodiment of the present invention.

As illustrated in FIG. 2, a computer according to the present invention comprises a central processing unit (CPU) 10, a mode signal output unit 20, a CPU power supply 30 and a control unit 40.

The CPU 20 is driven with the use of a core voltage (Vcore) as required driving power, supplied from the CPU power supply 30, to thereby perform operations or functions to process data, etc. The CPU 20 may supply a signal to determine a level of the core voltage (Vcore) required for driving itself, e.g., a VID (Voltage Identification) code, to the CPU power supply 30.

In addition, the CPU 10 according to the present invention can be operated with at least two or more operation modes. In other words, the CPU 10 can be operated under any one of the states of C0, C1, C2, C3 and C4 which are operation modes associated with power states as defined by the ACPI. As describe above, C0 has been defined as a normal state, C1 as a halt state, C2 as a stop-grant state, C3 as a stop clock state or a deep sleep mode and C4 as a deeper sleep mode.

The mode signal output unit 20 checks an operation mode of the CPU 10 and outputs an operation mode signal (DRS) corresponding to the current operation mode of the CPU 10. The mode signal output unit 20 may output operation mode signals (DRS) having different logical values when the CPU is switched between a deep sleep mode C3 and a deeper sleep mode C4. For example, when the CPU 10 is in operation under the deep sleep mode C3, the mode signal output unit 20 outputs an operation mode signal (DRS) of a low level. But, when the CPU is switched to the deeper sleep mode C4, the mode signal output unit 20 may switch the DRS of the low level to the DRS of a high level.

Here, the mode signal output unit 20 according to the present invention may comprise an input output control hub (ICH), which is a chipset manufactured by Intel® Corporation, or a south bridge.

The CPU power supply 30 supplies power required for driving the CPU 10, namely, a core voltage (Vcore). The CPU power supply 30 outputs the core voltage (Vcore) of the level required for by the CPU 10 based on a VID code supplied from the CPU 10.

Further, the CPU power supply 30 receives an operation mode signal (DRS) inputted from the mode signal output unit 20, and supplies the core voltage (Vcore) of the voltage level corresponding to the operation mode signal (DRS) inputted to the CPU 10. For example, where the operation mode signal (DRS) has a logical value corresponding to the deep sleep mode C3, the CPU power supply 30 supplies the core voltage (Vcore) of 1.05V to 1.15V to the CPU 10. Where the operation mode signal (DRS) has a logical value corresponding to the deeper sleep mode C4, the CPU power supply 30 supplies the core voltage (Vcore) of approximately 0.85V to the CPU 10.

The control unit 40 is decreasing an equivalent series resistance (ESR) value to power outputted from the CPU power supply 30 for a predetermined period of time for delay from when switching an operation mode of the CPU 10 has been sensed based on the operation mode signal (DRS) outputted from the mode signal output unit 20. According to this, it is possible to reduce oscillation noise generated from electric devices of the CPU power supply 30 due to a fluctuation in the current resulting from conversion of the core voltage (Vcore) outputted from the CPU power supply 30 when the operation mode of the CPU 10 has been switched.

Figure 3:
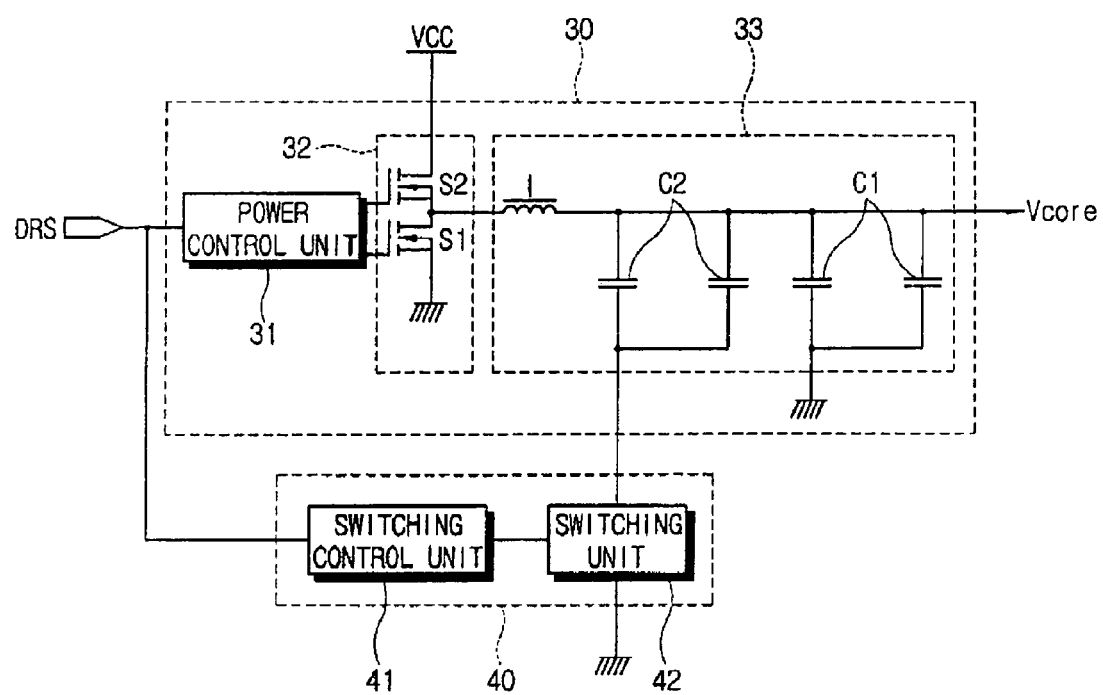
FIGS. 3 and 4 are block diagrams illustrating controls by the computer according to exemplary embodiments of the present invention.
Figure 4:
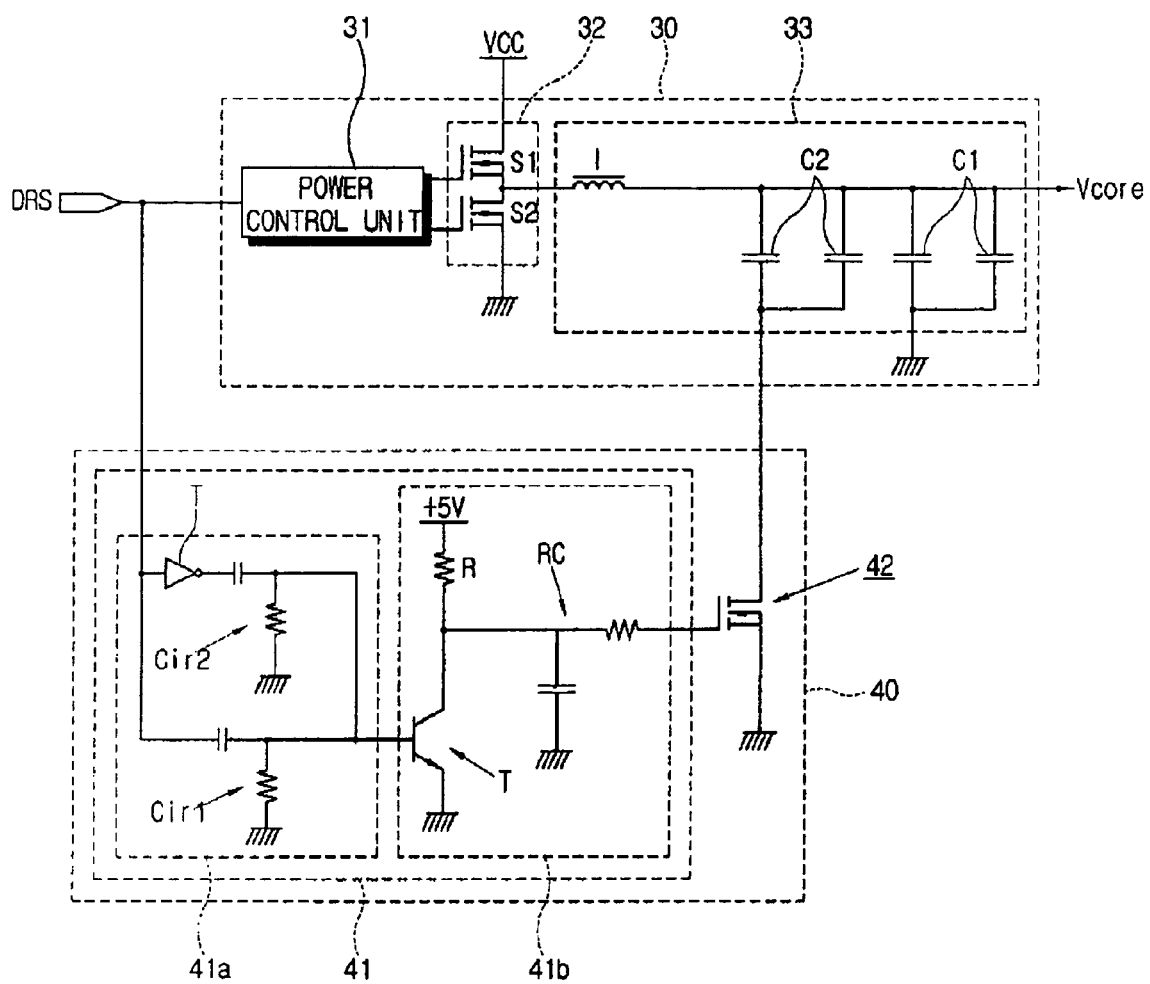

Referring to FIGS. 3 and 4, a computer according to an exemplary embodiment of the present invention will be described in detail.

The CPU power supply 30 according to an exemplary embodiment of the present invention comprises a power control unit 31, a power output unit 32 and a resonant circuit unit 33.

The power output unit 32 receives an input power (Vcc) from a power source (not shown), for example, an adaptor or a battery and outputs the input power (Vcc) to a square wave by a switching operation. Here, power from the adaptor or the battery may be supplied, being converted adaptively to a voltage level of the input power (Vcc) of the power output unit 32 though a DC/DC converter.

By way of example, the power output unit 32 according to the present invention comprises a pair of MOS transistors S1 and S2 which are switched according to control by the power control unit 31. Besides, the power output unit 32 may have different circuit configurations which include a plurality of switching devices shaped with a half bridge type or a full bridge type and can output an input power (Vcc) into square wave power.

The resonant circuit unit 33 converts square wave power outputted from the power output unit 32 into sine curve power and supplies the sine curve power to the CPU 10. The resonant circuit unit 33 according to the present invention may comprise at least one first capacitor C1, at least one second capacitor C2 connected in parallel with the first capacitor C1, and an inductor I connected between an output end of the power output unit 32 and an input end of the first capacitor A1 and/or the second capacitor C2. FIGS. 3 and 4 illustrate an example that a pair of the first capacitors C1 and a pair of the second capacitors C2 are respectively connected in parallel.

Here, the second capacitor C2 is connected to the first capacitor C1 in parallel or the former is disconnected from the latter, according to on or off operations of a switching unit 42 of the control unit 40 to be described later. Here, the equivalent series resistance (ESR) value of the resonant circuit unit 33 at the state that the second capacitor C2 is disconnected from the first capacitor C1 is lower than at the state that both of them are connected in parallel. According to this, the current amount of power outputted from the resonant circuit unit 33 is reduced at the state that the second capacitor C2 is disconnected from the first capacitor C1.

The power control unit 31 controls a switching operation of the power output unit 32 so that the level of a core voltage (Vcore) outputted through the resonant circuit unit 33 varies based on a VID code from the CPU 10 or an operation mode signal (DRS) from the mode signal output unit 20.

The power control unit 31 according to the present invention employs a control method of pulse width modulation (PWM) to control a switching operation of the power output unit 32 so that the level of the core voltage (Vcore) outputted from the resonant circuit unit 33 is varied.

Meanwhile, the control unit 40 according to the present invention comprises the switching unit 42 and a switching control unit 41 as illustrated in FIGS. 3 and 4.

The switching unit 42 is turned on or off according to control by the switching control unit 41, thereby varying the equivalent series resistance (DRS) value of the resonant circuit unit 33 described above. Referring to FIG. 4, where the switching unit 42 is turned on according to control by the switching control unit 41, the second capacitor C2 of the resonant circuit unit 33 is connected in parallel to the first capacitor C1. Conversely, where the switching unit 42 is turned off according to the control by the switching control unit 41, the second capacitor C2 and the first capacitor C1 of the resonant circuit unit 33 in parallel connection are disconnected from each other, and only the first capacitor C1 constitutes the resonant circuit unit 33 along with the inductor I. According to this, when the switching unit 42 is turned off, the equivalent series resistance value of the resonant circuit unit 33 is lowered than at the state that the switching unit 42 is turned on.

The switching control unit 41 turns on or off the switching unit 42 based on the operation mode signal (DRS) from the mode signal output unit 20. Referring to FIG. 4 again, the switching control unit 41 according to the present invention may comprise a differential circuit unit 41a and a delay circuit unit 41b.

Figure 5:
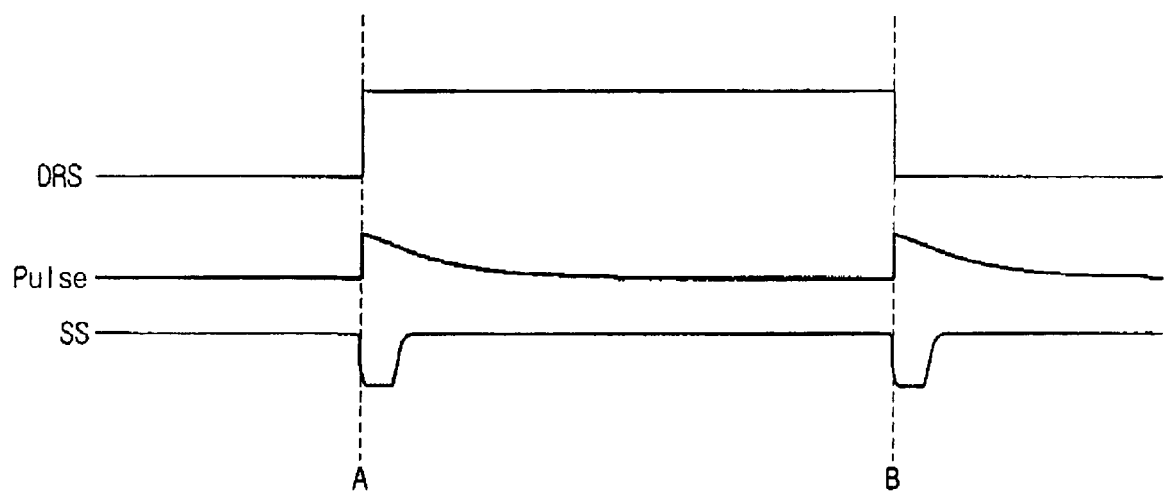
FIGS. 5 and 6 are diagrams illustrating waveforms of signals from the computer according to exemplary embodiments of the present invention.

The differential circuit unit 41a receives an operation mode signal (DRS) and outputs a predetermined pulse signal (refer to FIG. 5). The differential circuit unit 41a comprises a first circuit (Cir1) and a second circuit (Cir2) connected with each other in parallel. The operation mode signal (DRS) is inputted to the first circuit (Cir1), and the operation mode signal (DRS) of which a logic value is reversed by a logic inverter is inputted to the second circuit (Cir2). Here, the first circuit (Cir1) and the second circuit (Cir2) comprise their respective resistor and capacitor.

The delay circuit unit 41b comprises a switching device T which is turned on or off according to a pulse signal from a differential circuit unit 41a and a resistor-capacitor (RC) circuit unit on the line branched from a node between the switching device T and an input power (+5V).

FIG. 5 illustrates a relationship among the operation mode signal (DRS), the pulse signal, and signals (SS) which are outputted from the delay circuit unit 41b and control the switching unit 42, as depicted in FIGS. 3 and 4. Here, when an operation mode of the CPU 10 is in the deep sleep mode C3, the logical value of the operation mode signal (DRS) has a low level. When an operation mode of the CPU 10 is in the deeper sleep mode C4, the logical value of the operation mode signal (DRS) has a high level.

Referring to FIG. 5, when an operation mode of the CPU 10 is switched to the deeper sleep mode C4 from the deep sleep mode C3, the logical value of the operation mode signal (DRS) is switched to the high level from the low level.

In this case, the differential circuit unit 41a outputs a pulse signal as shown in FIG. 5, and the pulse signal outputted from the differential circuit unit 41a turns on the switching device T of the delay circuit unit 41b. When the switching device T is turned on by the pulse signal, the logical value of the delay circuit unit 41b is switched to the low level from the high level, thereby turning off the switching unit 42. After an off state of the switching unit 42 is delayed for a predetermined period of time by the RC circuit unit of the delay circuit unit 41b, the switching unit 42 is switched again to the on state (refer to SS in FIG. 5).

Meanwhile, when the operation mode of the CPU 10 is switched to the deeper sleep mode C4 from the deep sleep mode C3, the power control unit 31 of the CPU power supply 30 senses that the current operation mode of the CPU 10 has been switched to the deeper sleep mode C4 and then controls a switching operation of the power output unit 32 so that a core voltage (V core) of the level corresponding to the deeper sleep mode C4 can be outputted.

Figure 6:
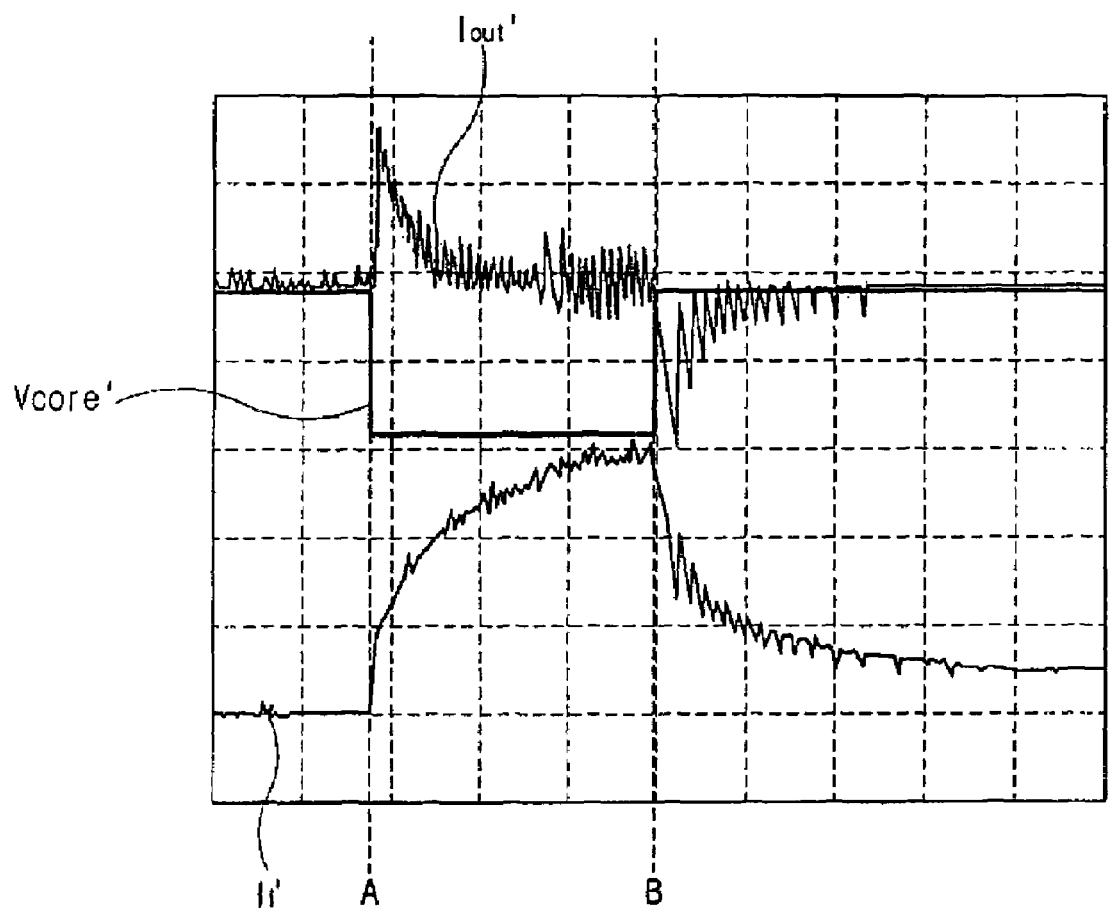
Figure 7:
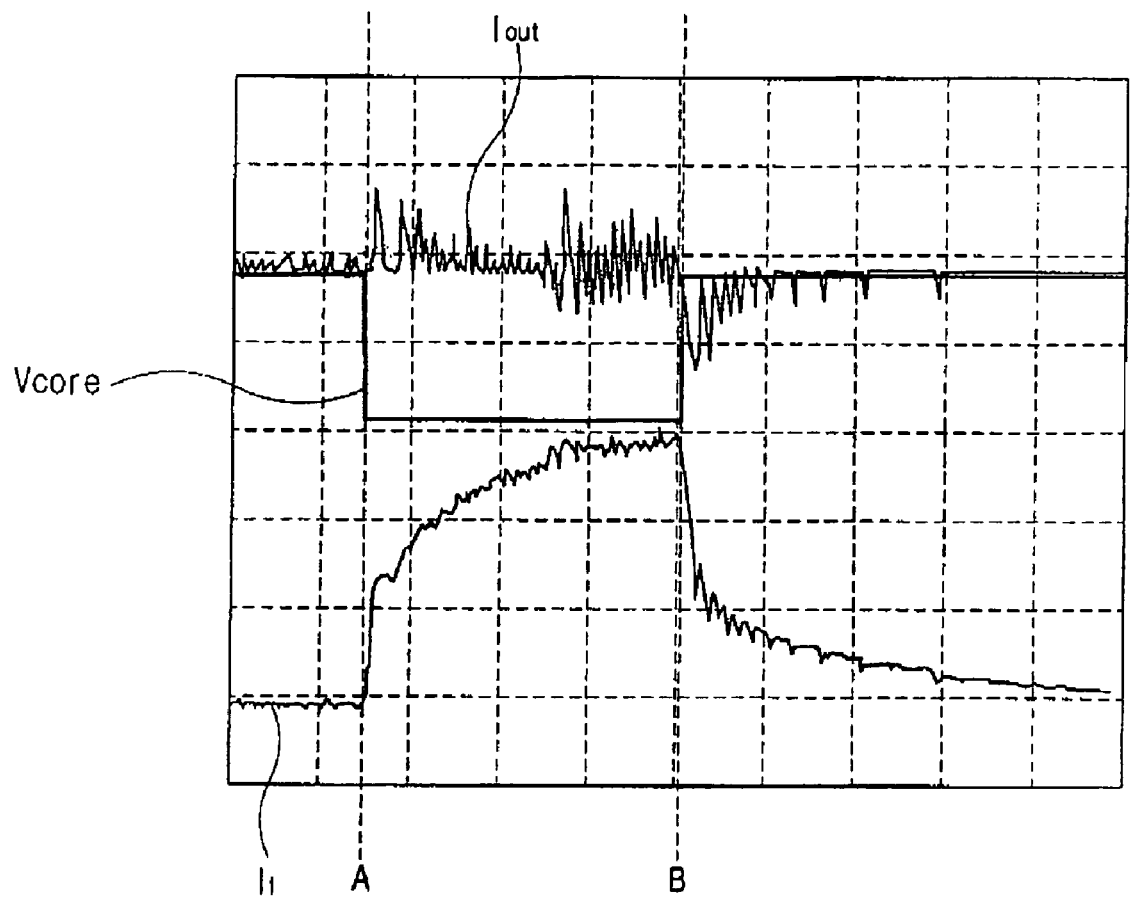
FIG. 7 is a diagram illustrating waveforms of signals from the conventional computer.

FIGS. 6 and 7 compare a core voltage (Vcore) outputted from the CPU power supply of the computer according to the present invention, and the conventional computer output currents (Iout', Iout) and input currents (II', II) of the inductor (I).

Here, a time point A is a point of time when an operation mode of the CPU 10 is switched to a deeper sleep mode C4 from a deep sleep mode C3 and a time point B is a point of time when the operation mode of the CPU 10 is switched to the deep sleep mode C3 from the deeper sleep mode C4.

At first, when the operation mode of the CPU 10 is switched to the deeper sleep mode C4 at the time point A, the level of a core voltage (Vcore) is lowered. As described above, when the operation mode of the CPU 10 is switched to the deeper sleep mode C4, the equivalent series resistance value of the resonant circuit unit 33 of the CPU power supply 30 is reduced, from which it can be known that the output current (Iout', Iout) of the resonant circuit unit 33 has been lowered in FIG. 6 than in FIG. 7. Accordingly, since a fluctuation in the output current (Iout', Iout) is reduced, resonant noise from the resonant circuit unit 33 and oscillation noise from the ceramic condenser due to the fluctuation in the output current (Iout', Iout) can be considerably reduced. Further, power consumption of the CPU power supply 30 is reduced according to reduction in the output current (Iout', Iout).

Meanwhile, when the operation mode of the CPU 10 is switched to the deep sleep mode C3 from the deeper sleep mode C4 at the time point B, the output current (Iout', Iout) is also lowered. Especially, since an input current (II) inputted into the inductor (I) due to reduction of the equivalent series resistance is sharply decreased, this allows rapid response to conversion of a core voltage (Vcore) due to the switching of an operation to be accomplished and power consumption to be reduced at the same time.

FIG. 4 illustrates a configuration of a control unit according to an exemplary embodiment of the present invention. Besides, any person in the art can easily understand that the control unit 40 of the present invention may be constructed with other circuit configurations under the technical concept of the present invention to perform functions of the differential circuit unit 41a, the delay circuit unit 41b and the switching unit 42.

In addition, an exemplary embodiment of the present invention has been described by way of example with respect to a case when an operation mode of the CPU 10 is switched between the deep sleep mode C3 and the deeper sleep mode C4. Besides, this exemplary embodiment may be applicable to switching of the other operation mode when noise is generated when the level of power outputted from the CPU power supply 30 resulting from variation of the operation mode of the CPU 10 varies.

Accordingly, noise generated when an operation mode of the CPU is switched can be effectively reduced by providing a mode signal output unit outputting an operation mode signal corresponding to an operation mode of the CPU, a CPU power supply supplying to the CPU power of a voltage level corresponding to the operation mode signal outputted from the mode signal output unit, a control unit controlling the CPU power supply so that an equivalent series resistance value to power outputted from the CPU power supply for a predetermined period of time for delay from when switching an operation mode of the CPU has been sensed, based on the operation mode signal outputted from the mode signal output unit.

As described above, according to the present invention there is provided a computer capable of reducing noise generated when an operation mode of the CPU is switched and a control method and medium thereof.

Further according to the present invention, there are also provided a computer capable of reducing power consumption when an operation mode of the CPU is switched and a control method thereof.

In addition to the above described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code is stored/transferred and executed in a distributed fashion.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A computer having a central processing unit (CPU) which operates with at least two operation modes, the computer comprising:
  a mode signal output unit to output an operation mode signal corresponding to a current operation mode of the CPU;
  a CPU power supply to supply power having a voltage level corresponding to the operation mode signal outputted from the mode signal output unit to the CPU; and
  a control unit to control the CPU power supply to decrease an equivalent series resistance value to power outputted from the CPU power supply for a predetermined period of time from when switching the current operation mode of the CPU has been sensed, based on the operation mode signal outputted from the mode signal output unit.

2. The computer as claimed in claim 1, wherein the at least two operation modes of the CPU include a deep sleep mode and a deeper sleep mode.

3. The computer as claimed in claim 2, wherein the mode signal output unit changes a logical value of the operation mode signal when the CPU is switched between the deep sleep mode and the deeper sleep mode.

4. The computer as claimed in claim 2, wherein the control unit comprises:
  a switching unit turned on or off to allow the equivalent series resistance value to vary; and
  a switching control unit turning on or off the switching unit based on the operation mode signal.

5. The computer as claimed in claim 4, wherein the switching control unit comprises:

a differential circuit unit receiving the operation mode signal to generate a predetermined pulse signal; and a delay circuit unit maintaining an off state of the switching unit for the predetermined period of time from when the pulse signal is outputted, based on the pulse signal outputted from the differential circuit unit.

6. The computer as claimed in claim 5, wherein the CPU power supply comprises:

a power output unit converting a predetermined input power to a square wave power;

a resonant circuit unit converting the square wave power outputted from the power output unit to a sine curve power and supplying the sine curve power to the CPU; and a power control unit controlling a switching operation of the power output unit to be supplied the power of a voltage level corresponding to the operation mode signal from the mode signal output unit to the CPU.

7. The computer as claimed in claim 6, wherein the resonant circuit unit comprises:

at least one first capacitor;

an inductor connected between an output terminal of the square wave power of the power output unit and an input terminal of the first capacitor; and at least one second capacitor connected in parallel to the first capacitor when the switching unit is turned on and disconnected from the first capacitor when the switching unit is turned off.

8. A method of controlling power supply to a computer having a central processing unit (CPU) operating with at least two operation modes, the method comprising:

sensing a current operation mode of the CPU and outputting an operation mode signal corresponding to a result from the sensing;

supplying power having a voltage level corresponding to the operation mode signal to the CPU; and decreasing an equivalent series resistance value to power supplied to the CPU for a predetermined period of time from when switching the current operation mode of the CPU has been sensed, based on the operation mode signal.

9. The method as claimed in claim 8, wherein decreasing the equivalent series resistance value comprises:

generating a predetermined pulse signal when the current operation mode of the CPU is switched, based on the operation mode signal; and decreasing the equivalent series resistance value for the predetermined period of time for delay when the pulse signal is outputted, based on the pulse signal.

10. The computer as claimed in claim 2, wherein the at least two operation modes of the CPU are the deep sleep mode and deeper sleeping mode of Advanced Configuration and Power interface standard.

11. The method as claimed in claim 8, wherein the at least two operation modes of the CPU are standard modes of operation in accordance with Advanced Configuration and Power Interface standard.

* * * * *